(12) United States Patent
Brouwer (10) Patent No.: US 7,090,364 B1
(45) Date of Patent: Aug. 15, 2006

(54) MOVEMENT MECHANISM (75) Inventor: Stefan Frits Brouwer, The Hague (NL)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/009,358

(22) PCT Filed: May 17, 2000

(86) PCT No.: PCT/NL00/00326

§ 371 (c)(1),
(2), (4) Date: May 28, 2002

(87) PCT Pub. No.: WO00/69683

PCT Pub. Date: Nov. 23, 2000

(30) Foreign Application Priority Data

May 18, 1999 (NL) .................................. 1012090

(51) Int. Cl.
*G02B 7/182* (2006.01)
(52) U.S. Cl. ...................................... 359/876; 248/484
(58) Field of Classification Search ................ 359/876, 359/877; 248/481, 484
See application file for complete search history.

(56) References Cited

U.S. PATENT DOCUMENTS 4,628,760 A * 12/1986 Huddleston ................ 74/502.1
5,363,246 A * 11/1994 Perry et al. .................. 359/874
5,969,891 A * 10/1999 Otenio et al. ................ 359/871

* cited by examiner

*Primary Examiner*—Alessandro Amari
(74) *Attorney, Agent, or Firm*—Anna M. Shih (57) ABSTRACT

A movement mechanism applicable to a vehicle outside rearview mirror and employing a substantially spherical holder and a substantially spherical bowl nested one in the other and relative rotatable relative to each other about first and second mutually perpendicular axes with the plane of the outer edge of the holder lying in or parallel to the plane of the axes. The disk is located between the holder and bowl and connected to the bowl for rotation about one of the axes and connected to the holder for rotation only about the other of the axes.

21 Claims, 11 Drawing Sheets

MOVEMENT MECHANISM

BACKGROUND OF THE INVENTION

The present invention relates to a movement mechanism comprising a spherical holder and a spherical bowl which, one inserted into the other, are rotatable relative to each other about a first axis, the X-axis, and a second axis, the Y-axis, said axes lying in a plane coinciding with the plane of the outer edge of the holder or extending parallel thereto, the movement mechanism further comprising a dish located between the holder and the bowl, said dish being connected to the bowl for rotation about the X-axis only and connected to the holder for rotation about the Y-axis only.

Such movement mechanism is known from EP-A-0 075 259. The movement mechanism in said document comprises a bowl, a holder and a dish, wherein the holder can rotate relative to the dish around a first axis only and the bowl can rotate relative to the dish around a second axis only. The bowl, the holder and the dish are mounted together by means of a bolt which fills the inner spece of the holder, such that no further construction parts can be placed therein. The movement mechanism is a type of ball joint.

The movement mechanism can, for instance, be used for causing an object that is fixedly connected to the holder to make a movement about two axes relative to a fixedly disposed bowl, and can be used for, for instance, wing mirrors of vehicles, wherein a mirror plate can be mounted on the holder, while the bowl is mounted in the housing of the mirror plate, which housing can be secured on a vehicle.

SUMMARY OF THE INVENTION

The object of the invention is to realize a movement mechanism, which, for instance for application to a motor-drivable wing mirror of a vehicle, permits an extremely compact construction with as few components as possible.

Therefore, in accordance with the invention, the movement mechanism as described in the opening paragraph is characterized in that that fitted in the holder there is provided an actuator, the actuator being operatively connected to the bowl through openings in the holder and an opening in the dish for rotating the holder relative to the bowl about the X- and Y-axis.

To obtain a guidance for the rotary movement of the holder and the dish relative to each other and at the same time a securement against rotations of these parts relative to each other about an axis, the Z-axis, perpendicular to the X-axis and the Y-axis, various solutions are possible. In a first embodiment, the dish may be provided with diametrically opposite thickenings which, upon rotation of the dish relative to the holder about the X-axis, cooperate with relevant slots in the holder that extend in the direction of rotation. In a second embodiment, the dish may be provided with diametrically opposite thickenings which, upon rotation of the dish relative to the holder about the X-axis, cooperate with relevant slots in the dish that extend in the direction of rotation. In a third embodiment, the dish may then may be provided with a thickening and a diametrically opposite slot that extends in the direction of rotation, which thickening and which slot, upon rotation of the dish relative to the holder about the X-axis, cooperate with a slot in the holder extending in the direction of rotation, or a diametrically opposite thickening on the holder respectively.

To ensure the connection between the holder and the dish, of course also during the relative movement of the two parts with respect to each other, the holder may have its outer surface provided with circularly curved edges which, upon rotation of the dish relative to the holder about the X-axis, serve as guide edges for correspondingly shaped edges provided on the dish. These circular edges may be recessed in or project from the holder.

For bounding the rotary travel between the holder and the dish, the holder may be provided with an outwardly directed, circular edge and the dish, viewed in a section perpendicular to the Y-axis, may be segment-shaped with an apex angle smaller than 180°, while in at least one extreme position of the dish relative to the holder, a relevant edge half of the dish abuts against the circular edge of the holder. Of course, also in both extreme positions of the dish relative to the holder, the relevant edge halves of the dish may abut against relevant parts of the circular edge of the holder. In addition, it is also possible to provide the holder, on the outer surface thereof, with at least one edge against which, in an extreme position of the dish relative to the holder, a corresponding edge of the dish abuts. This edge, too, may be recessed in as well as project from the holder. Here, too, two of such edges may be present for the two extreme positions.

Likewise, and for similar reasons as apply to the movement between the holder and the dish, three embodiments are also possible for the movement between the bowl and the dish. In a first embodiment, the dish may be provided with diametrically opposite thickenings which, upon rotation of the dish relative to the bowl about the Y-axis, cooperate with relevant slots in the bowl that extend in the direction of rotation. In a second embodiment, the bowl may again be provided with diametrically opposite thickenings which, upon rotation of the dish relative to the bowl about the Y-axis, cooperate with relevant slots in the dish that extend in the direction of rotation, while in a third embodiment, the bowl may be provided with a thickening and a diametrically opposite slot that extends in the direction of rotation, which thickening and which slot, upon rotation of the dish relative to the bowl about the Y-axis, cooperate with a slot in the dish extending in the direction of rotation, or a diametrically opposite thickening on the dish respectively.

Here, too, to ensure the connection between the bowl and the dish also during the relative movement of the two parts in respect of each other, the bowl may have its inside surface provided with circularly curved edges which, upon rotation of the dish relative to the bowl about the Y-axis, serve as guide edges for correspondingly shaped edges provided on the dish.

To bound the rotary travel again, in this case between the bowl and the dish, the holder may be provided with an outwardly directed, circular edge, as mentioned above, while in at least one extreme position of the bowl relative to the dish, the edge of the bowl abut against the circular edge of the holder. In an alternative embodiment herefor, in an extreme rotary position of the dish relative to the bowl, the above-mentioned thickenings for rotation and securement of the dish relative to the bowl may abut against an end edge of the slots.

Further, additional locking means may be provided between the dish and the holder and between the dish and the bowl, for further blocking a rotation of the bowl, dish and holder relative to each other about an axis, the Z-axis, perpendicular to the X-axis and the Y-axis.

Depending on the practical application of the movement mechanism, it may be important, when the dish is on both sides provided with outwardly set lips, to provide a defined friction between the bowl and the dish and between the dish and the holder. Without these lips, a highly temperature-dependent friction would be present between said parts.

In a particularly favorable and inexpensive embodiment, the holder, the bowl and the dish may be manufactured from plastic. In particular the various thickenings, slots, edges and additional locking means can readily be provided during the manufacturing of the holder, the bowl and the dish. Nevertheless, it is for instance also possible that the holder and the bowl are manufactured from plastic and that the dish is substantially manufactured from metal. In particular, the dish may be punched from metal. In the case where the dish is substantially manufactured from metal, the dish may be provided with metal springs to effect a defined friction between the bowl and the dish and between the dish and the holder.

As mentioned hereinabove, the major advantage of this movement mechanism precisely resides in the use of a motor drive of the holder relative to the bowl. To that end, in accordance with a further facet of the invention, the holder comprises two mutually perpendicular slots provided through the holder, each of said slots having a toothed element provided therein for displacement by motor, which toothed element is further freely movable in the bowl in a direction perpendicular to the direction of the relevant slot in the holder, wherein, further, the toothed element engages, through the relevant slot in the holder, a gear transmission mechanism placed in the holder, of a motor that is likewise placed in the holder. For the use in a wing mirror for a vehicle, an adjusting plate with a mirror can be fixed on the holder. When the motor and the drive mechanism are fitted in the holder as well, the holder with the components fitted therein and secured thereon can in a favorable manner be snap-fitted into the bowl as a unit. The latter construction further enables providing the holder with an electric plug terminal, while on the adjusting plate, a separate electric terminal is present for an electric connection to the plug terminal on the holder, enabling ready through-connecting by looping.

Apart from a movement mechanism, the invention also relates to a wing mirror for a vehicle, comprising a movement mechanism as indicated hereinabove.

BRIEF DESCRIPTION OF THE DRAWINGS

The invention will presently be specified with reference to the accompanying drawings. In these drawings.

In the Figures, identical parts are designated by the same reference numerals.

DETAILED DESCRIPTION

An exemplary embodiment of the movement mechanism according to the invention, as shown in parts and in interconnection of these parts in FIGS. 1–33, comprises a spherical holder 1, a spherical bowl 2 and a dish 3. The holder, the bowl and the dish are manufactured from plastic. With the interposition of the dish 3, the holder 1 can be inserted into the bowl 2. The dish 3 is then only rotatable about the X-axis relative to the bowl 2 and only rotatable about the Y-axis relative to the holder 1, the X-axis and the Y-axis lying in a plane substantially coinciding with the outside edge of the holder 1.

To realize the rotatability of the holder 1 relative to the dish 3 about the Y-axis, two diametrically opposite slots 4 and 5 are provided in the holder 1, and the dish 3 has its inside surface provided with thickenings 6 and 7 fitting in these slots 4 and 5 respectively. Upon rotation of the holder 1 relative to the dish 3 about the Y-axis, the thickenings 6 and 7 move in the slots 4 and 5 respectively. Further, the holder 1 has its outside surface provided with diametrically opposite, circularly curved edges 8 and 8a which, upon rotation of the holder 1 relative to the dish 3, serve as guide edges for correspondingly shaped edges of slots 9 and recesses 9a respectively, provided in the dish 3. Between the edges of the slots 9 and the circular recess 9a of the dish on the one hand and the thickenings 8 and 8a on the other, the holder 1 and the dish 3 are snap-fitted for movement relative to each other about the Y-axis.

To realize the rotatability of the dish 3 relative to the bowl 2 about the X-axis, two diametrically opposite slots 10 and 11 are provided in the bowl 2, and the dish 3 has its outside surface provided with thickenings 12 and 13 fitting in the slots 10 and 11 respectively. Upon rotation of the dish 3 relative to the bowl 2 about the X-axis, the thickenings 12 and 13 move in the slots 10 and 11 respectively. Further, the bowl 2 is provided with diametrically opposite, circular edges 14 which, upon rotation of the dish 3 relative to the bowl 2, serve as guide edges for correspondingly shaped edges of thickenings 15 provided on the outside surface of the dish 3. Between the thickenings 12, 13 on the one hand and the thickenings 15 on the other, the bowl 2 and the dish 3 are snap-fitted for movement relative to each other about the X-axis.

As extra securement against rotations about the Z-axis perpendicular to the X-axis and the Y-axis, additional locking means in the form of thickenings 16 provided on the outside surface of the dish 3 are present between the dish 3 and the bowl 2, which engage recesses 17 when the holder with dish are mounted in the bowl.

Figures 1, 2:
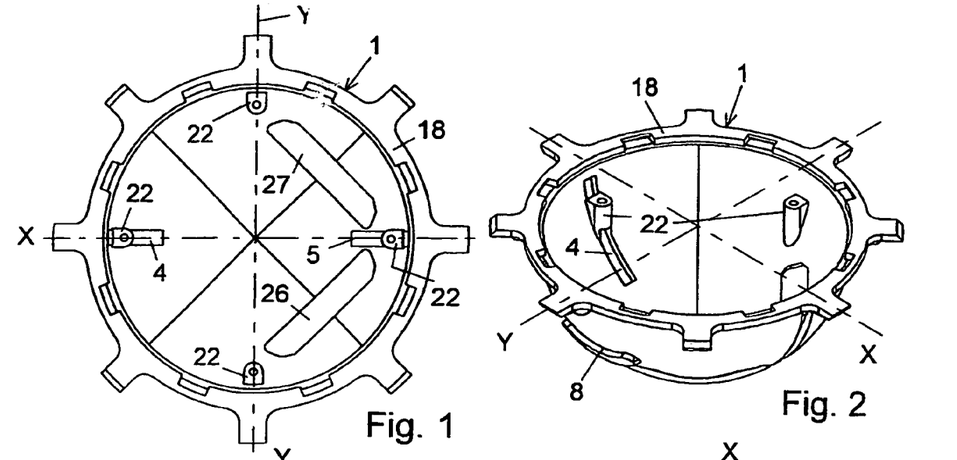
FIGS. 1–5 represent five views of the holder.
Figure 3:
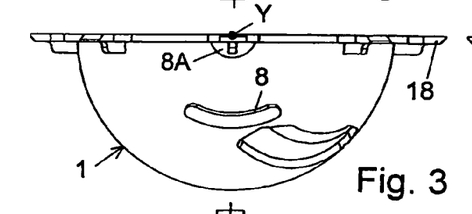
Figure 4:
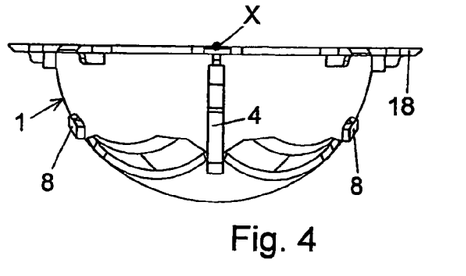
Figure 5:
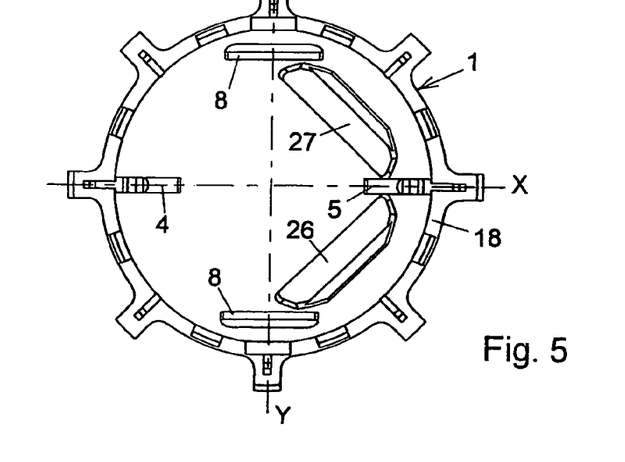
Figure 6:
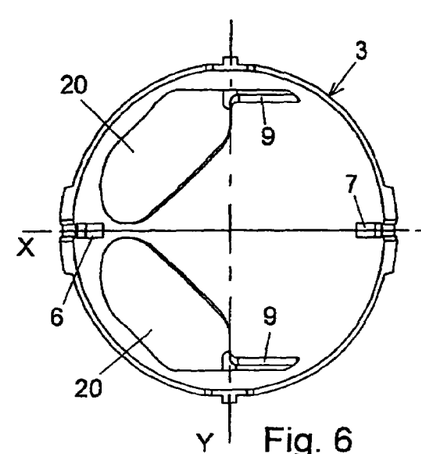
FIGS. 6–9 represent four views of the dish.
Figure 7:
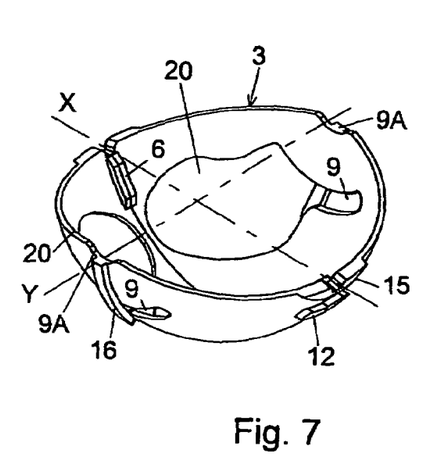
Figures 8, 9:
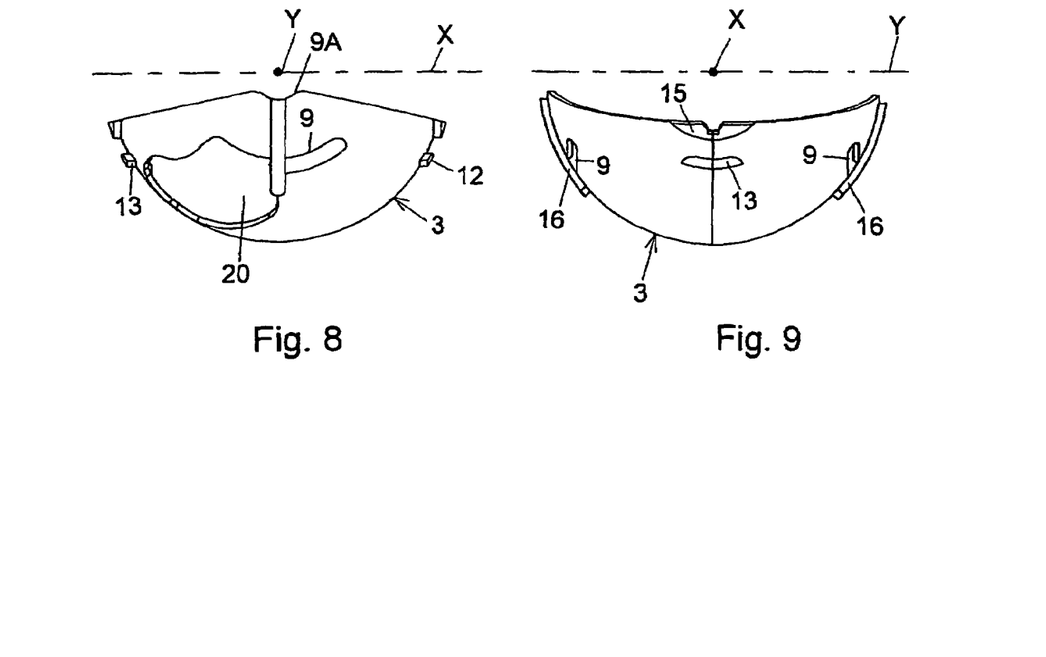
Figure 10:
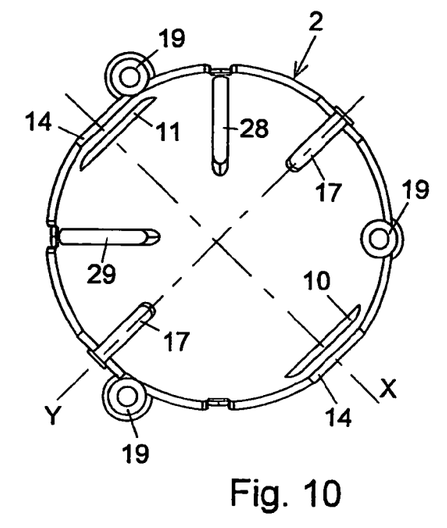
FIGS. 10–13 represent four views of the bowl.
Figure 11:
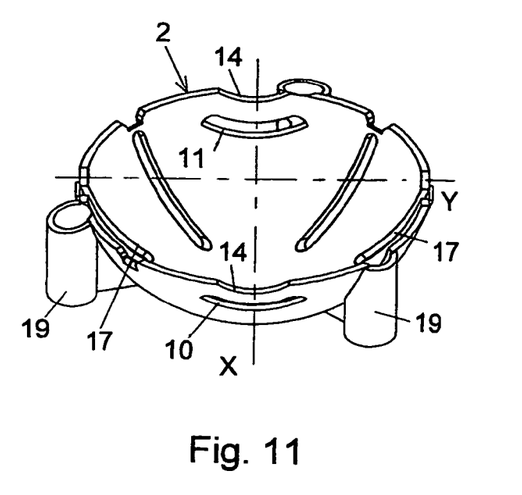
Figure 12:
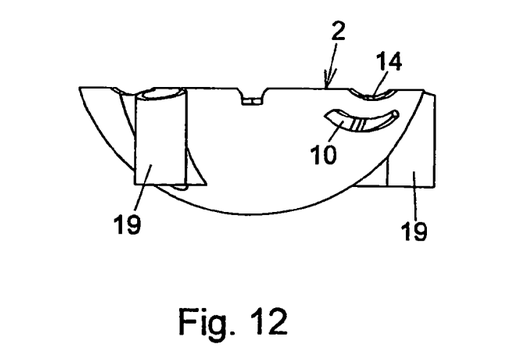
Figure 13:
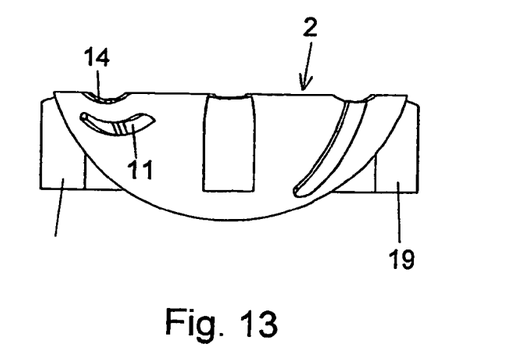

The movement of the holder 1 relative to the dish 3 and that of the dish relative to the bowl 2 is bounded. For this purpose, the holder has an outwardly directed, circular edge 18. Further, viewed in a section perpendicular to the Y-axis, as shown in FIG. 8, the dish 3 is segment-shaped with an apex angle smaller than 180°. When the holder 1 rotates about the Y-axis relative to the dish 3, the upper edges of the dish 3 will, in the two extreme positions, strike the edge 18. Upon rotation of the dish 3 relative to the bowl 2, the thickenings 12, 13 will, in the extreme positions, be arrested by the end edge of the slots 10, 11 or, which is of course also possible, the upper edges of the bowl will be arrested by the projecting edge 18 of the holder.

Figure 14:
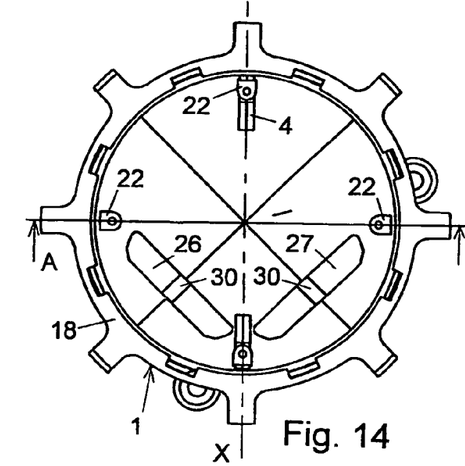
FIGS. 14–17 represent four views of the assembly of the holder, the dish and the bowl of FIGS. 1–13.
Figure 15:
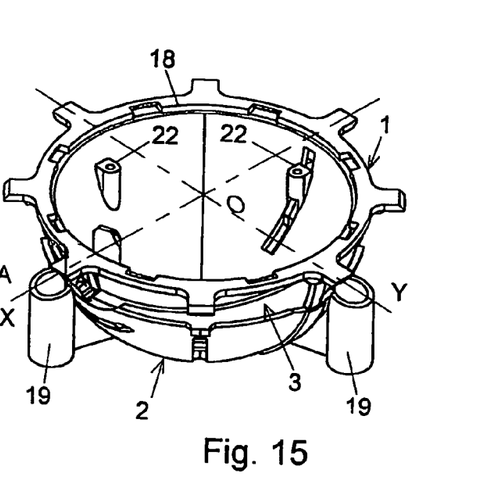
Figure 16:
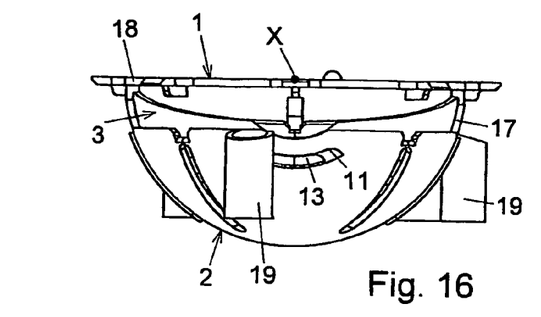
Figure 17:
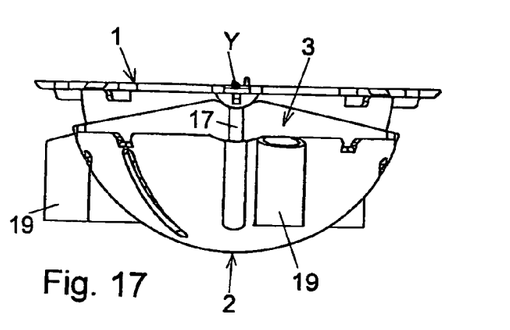
Figure 18:
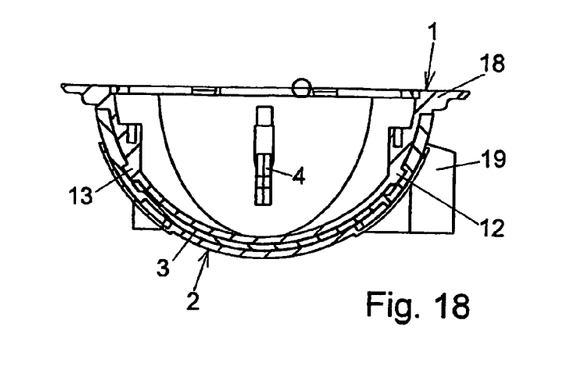
FIG. 18 shows a section of this assembly taken on the line A—A in FIG. 14.
Figure 19:
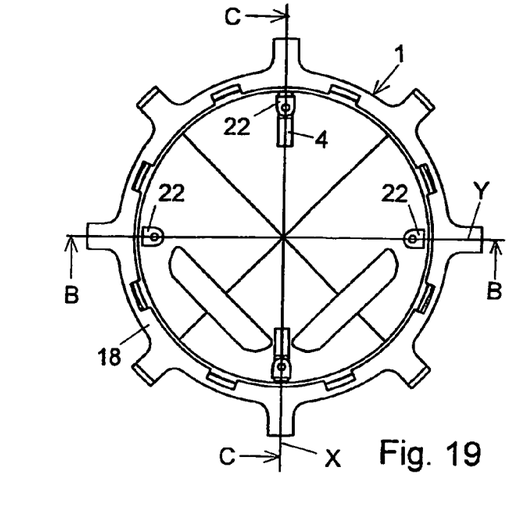
FIGS. 19–22 represent four views of the assembly of the holder and the dish.
Figure 20:
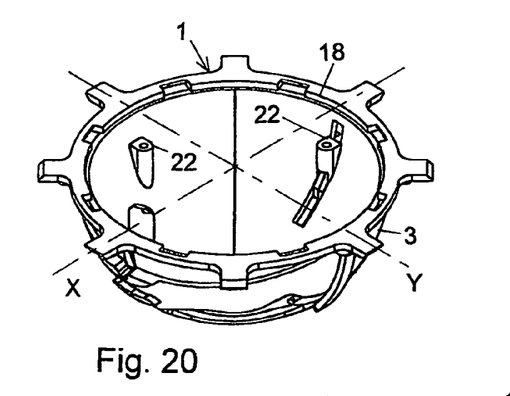
Figure 21:
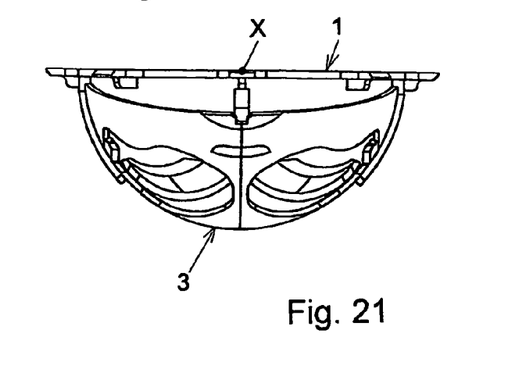
Figure 22:
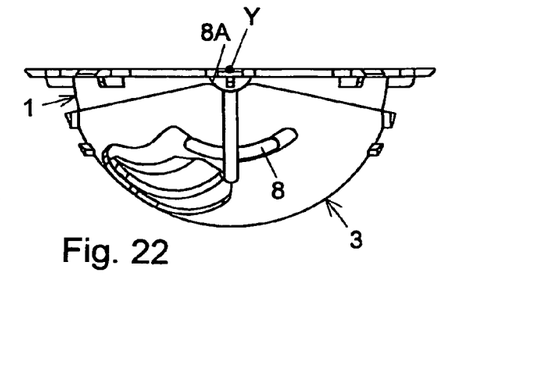
Figure 23:
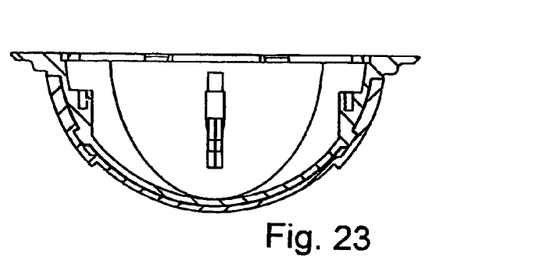
FIGS. 23 and 24 show sections taken on the line B—B and C—C respectively in FIG. 19.
Figure 24:
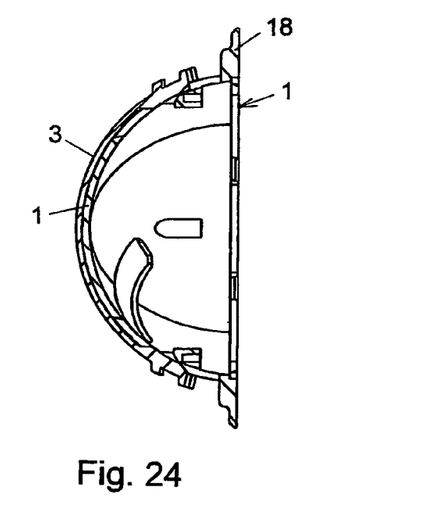
Figure 25:
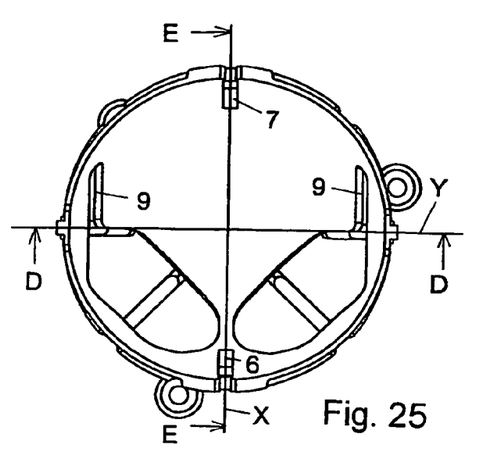
FIGS. 25–28 represent four views of the assembly of the dish and the bowl.
Figure 26:
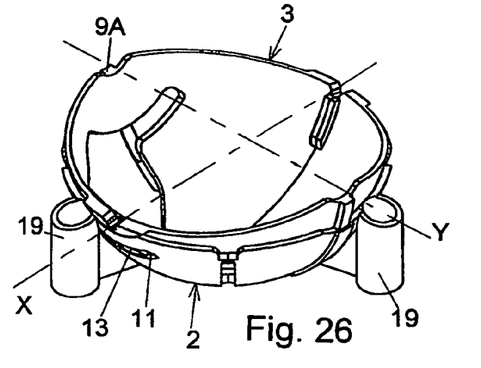
Figure 27:
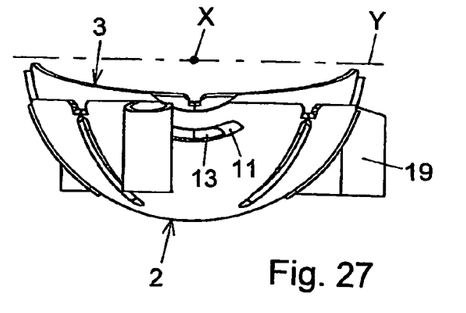
Figure 28:
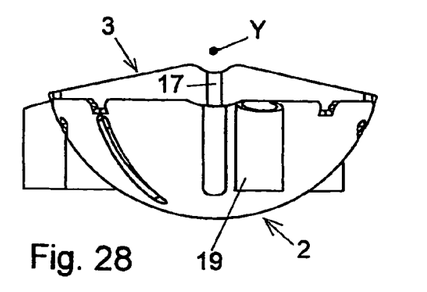
Figure 29:
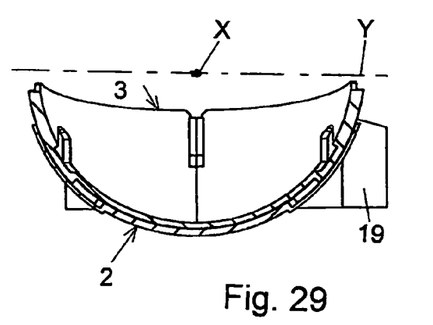
FIGS. 29 and 30 show sections taken on the line D—D and E—E respectively in FIG. 25.
Figure 30:
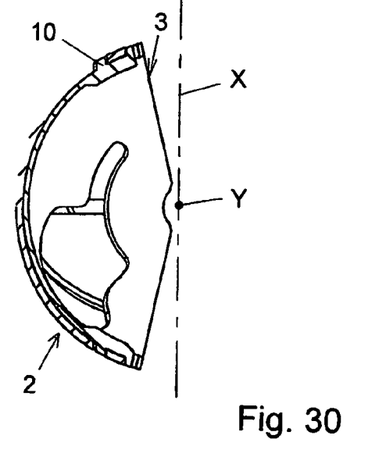
Figure 39:
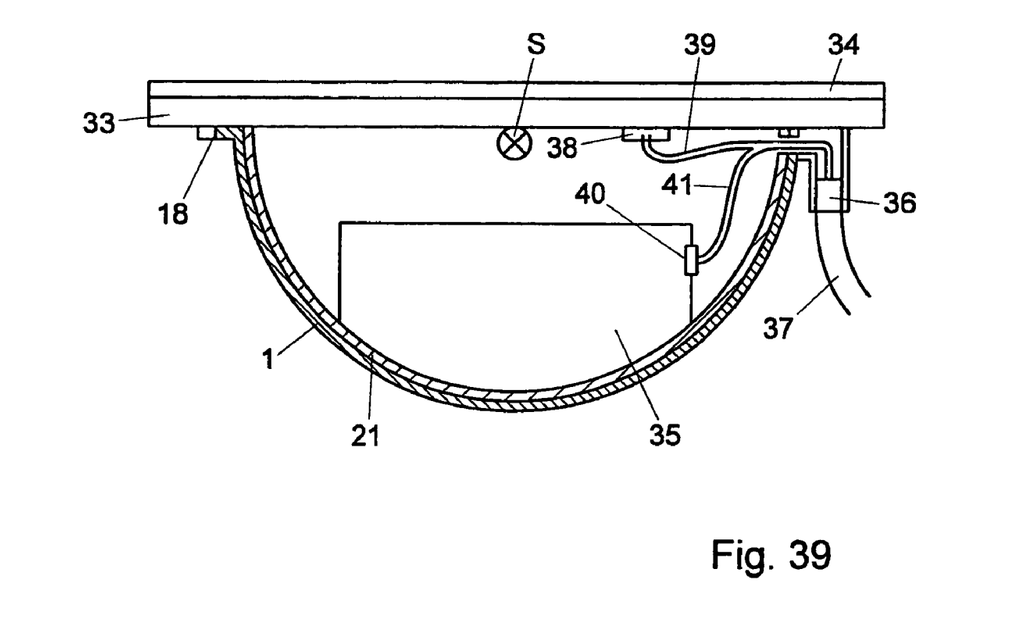
FIG. 39 schematically shows a mirror actuator according to the invention.

The bowl 2 further comprises mounting bushes 19. By means of screws passed through these bushes, the bowl can be secured in, for instance, a mirror housing frame for a wing mirror of a vehicle. When, in this practical application a mirror-adjusting plate 33 with mirror 34 (see FIG. 39) is secured on the holder 1, in particular on the edge 18 hereof, this mirror is manually rotatable about the X-axis and the Y-axis. The position of the holder, the dish and the bowl are shown, one inserted into the other, in FIG. 15, while different views are represented in FIGS. 14, 16 and 17. For clarification, FIGS. 19–24 show the situation where only the holder is secured in the dish for rotation about the Y-axis, and FIGS. 25–30 show the situation where only the dish is secured in the bowl for rotation about the X-axis.

Figure 31:
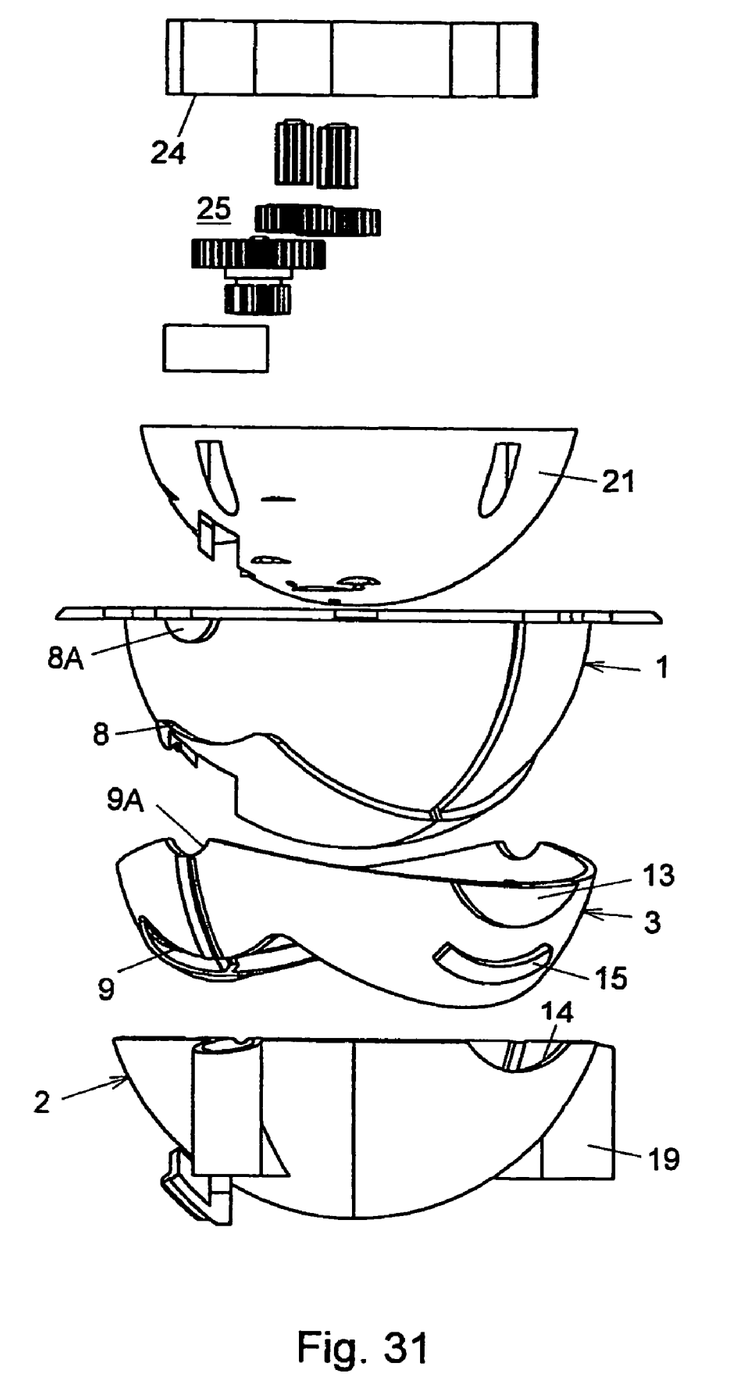
FIGS. 31–33 represent various exploded views of an actuator housing construction for a wing mirror of a vehicle.
Figure 32:
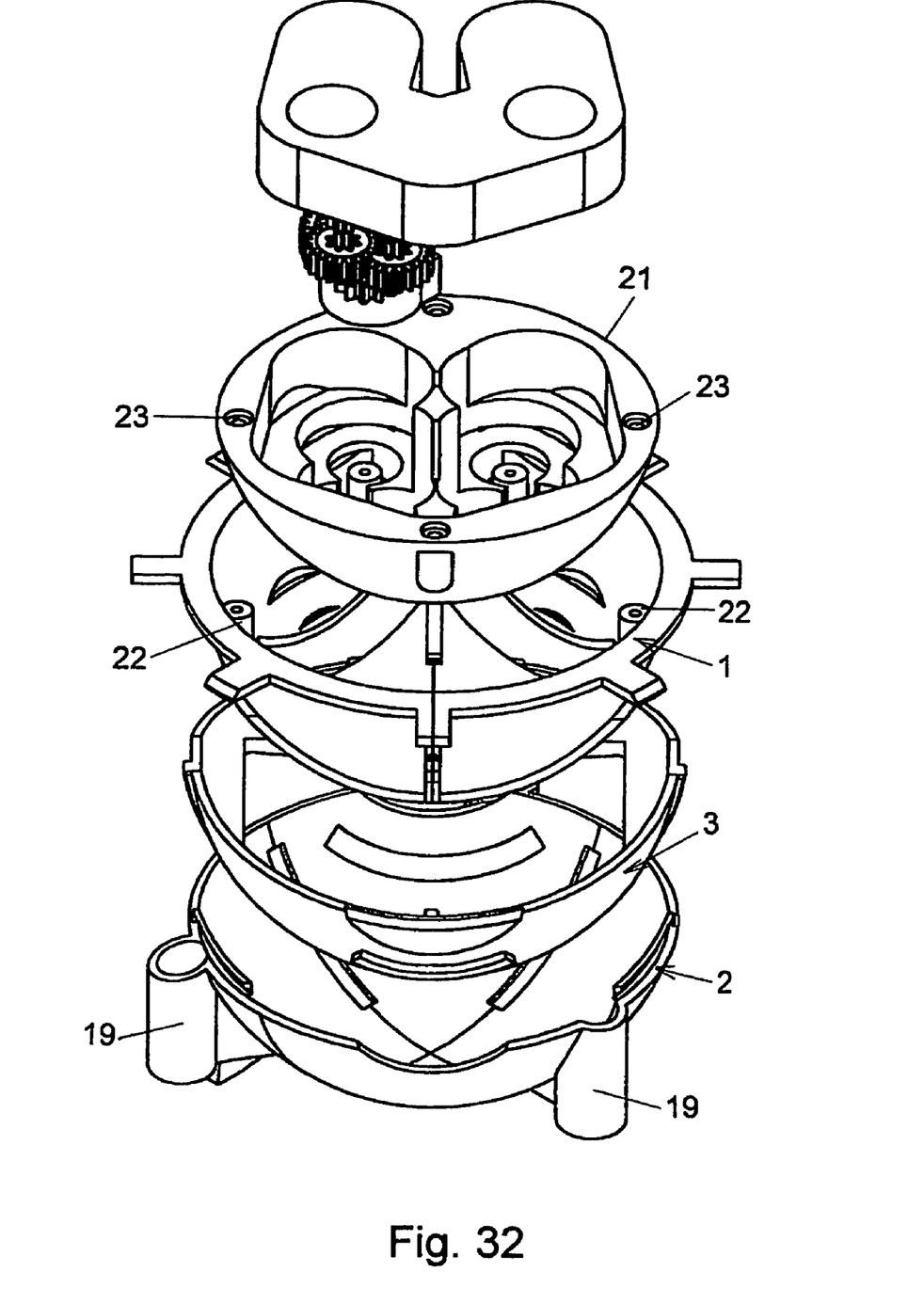
Figure 33:
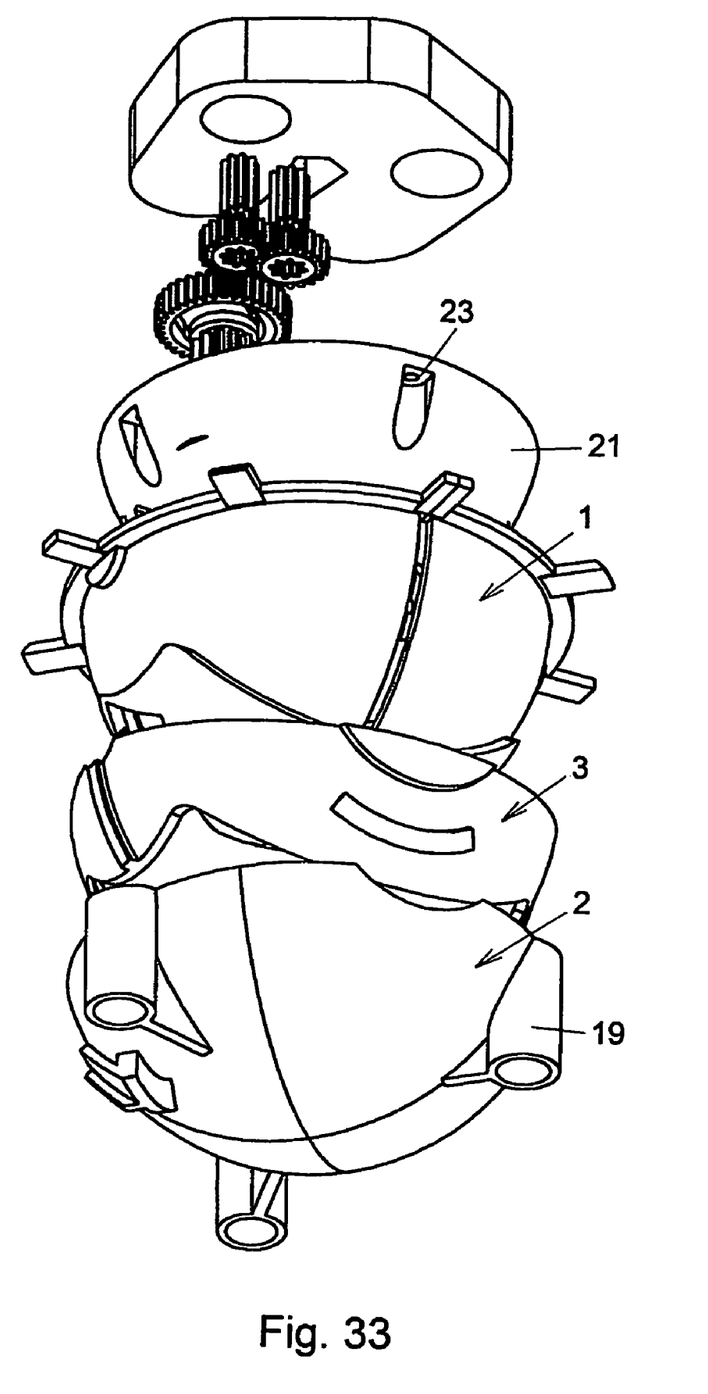
Figure 34:
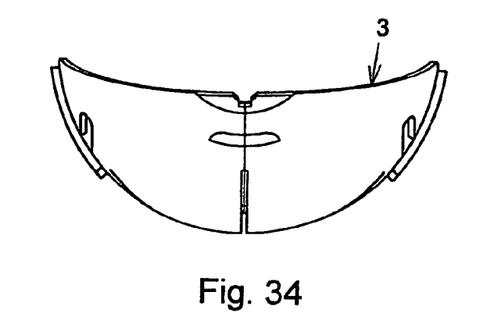
FIGS. 34–37 represent various views of an alternative embodiment of the dish.
Figure 35:
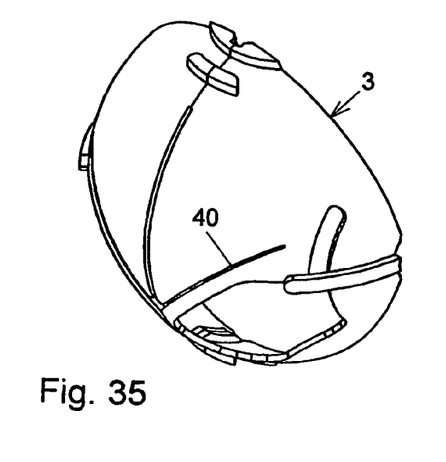
Figure 36:
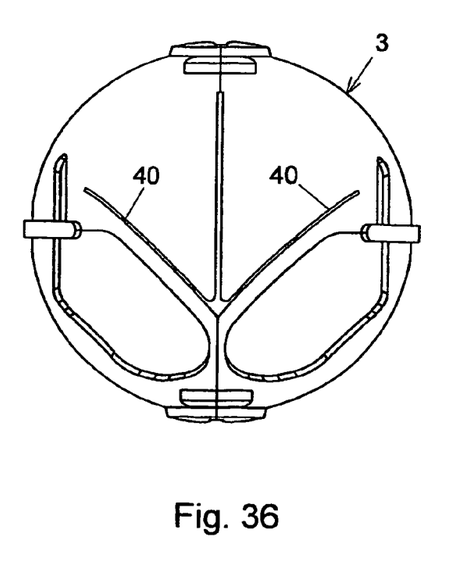
Figure 37:
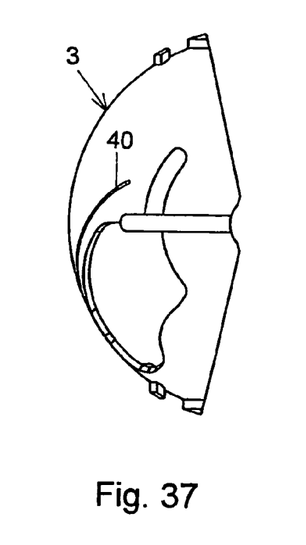
Figure 38:
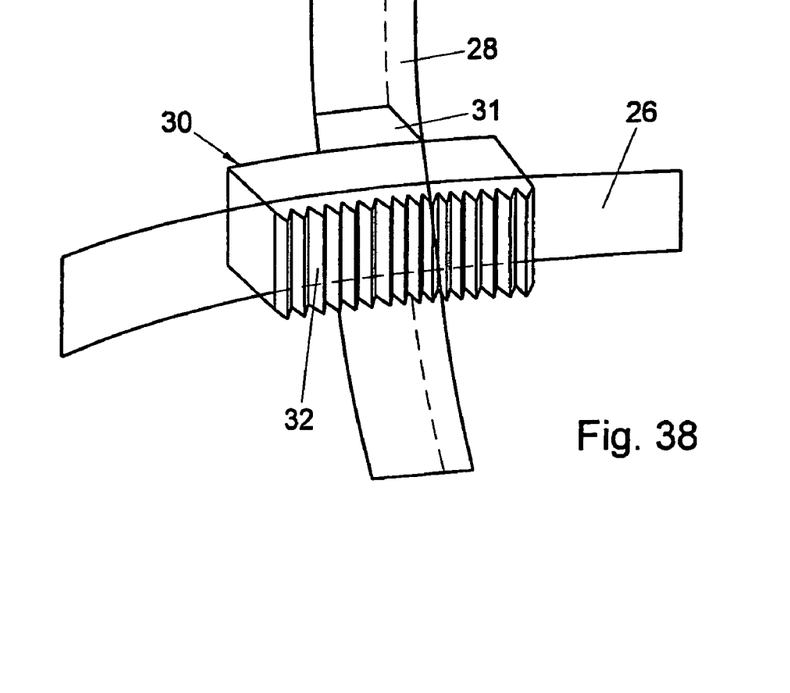
FIG. 38 shows the adjusting element for enabling rotating the holder and the bowl relative to each other.

The spherical construction of the holder 1, the dish 3 and the bowl 2 is particularly suitable for fitting a drive system in the holder 1. In the above-mentioned practical application for a wing mirror, this means that in the holder, the drive system is mounted for rotating the mirror and hence the holder about the X-axis and the Y-axis relative to the bowl and hence relative to the mirror housing frame. Because the drive system mounted in the holder 1 must be capable of engaging the bowl 2, relatively large openings 20 are provided in the dish 3. As indicated in FIGS. 31–33, the drive system is mounted in a spherical support 21 that can be screwed down in the holder 1. For that purpose, the holder 1 has screw bushes 22, while the support is at corresponding positions provided with screw holes 23. The holder 1 and the support 21 may also be manufactured as one whole. For the rotation about each of the two axes (the X-axis and the Y-axis), the drive system comprises, in a manner conventional for mirror actuators, a motor in a housing 24 and a transmission mechanism 25. These components form in fact the actuator; in FIG. 39, this actuator, including the housing 24, is designated by 35. Although in the transmission mechanism, a rod-shaped transmission can be incorporated, the transmission in the present embodiment is completely designed as a gear transmission mechanism. By means of this transmission mechanism 25, an adjusting element is displaced in a first direction, while this adjusting element is freely movable in a second direction perpendicular thereto. To enable, in this manner, a rotation of the holder 1 relative to the bowl 2, two slots 26 and 27 are provided in the holder 1, which slots, viewed in the X-Y plane, are perpendicular to each other, while in the bowl 2, two slots 28 and 29 are provided, which slots, viewed in the X-Y plane, are perpendicular to each other, the slot 26 intersecting the slot 28 centrally and perpendicularly, and the slot 27 intersecting the slot 29 centrally and perpendicularly. The slots 28 and 29 in the bowl 2 extend from the circumferential edge to the center of the bowl. To each pair of slots 26, 28 and 27, 29, it applies that an adjusting element 30 is freely movable in the slot 28 and 29 respectively, and motor-drivable in the slot 26 and 27 respectively. However, the reverse is of course also possible, i.e. an adjusting element may also be freely movable in the slot 26 and/or 27 and motor-drivable in the slot 28 and 29 respectively. Although the adjusting elements 30 are provided between the bowl 2 and the holder 3, at the location of the openings 20 in the dish 3, the adjusting elements project through the holder 1 for motor engagement from the inner space of the holder 1. One of the two adjusting elements 30 is shown in more detail in FIG. 38. The free movability of the adjusting elements 30 is realized in that they have their bowl-facing sides provided with a projection 31 engaging the slots 28 and 29. On their side projecting through the holder, the adjusting elements 30 are provided with teeth 32. In the Figure, the adjusting elements are designed as ring segments having inside teeth; a construction as ring segment having, for instance, crown teeth or bevel gear teeth is of course also possible. These teeth then cooperate with a correspondingly formed gear of the gear transmission mechanism.

The direction in which the adjusting elements 30 are motor-drivable may correspond to the two axis directions. However, if stepping motors are used instead of standard dc-motors, it is preferred that the adjusting elements be displaced by motor at an angle of 45° relative the two axis directions; this situation is shown in the embodiment depicted here (see FIGS. 1 and 10). Accordingly, upon rotation about one of the axes, both motors are actuated. Due to the motor displacement of one or both of the adjusting elements and the free movability in directions perpendicular hereto, a rotation of the holder 1 with support relative to the bowl 2 is effected and, accordingly, when used in a wing mirror of a vehicle, a rotation of the mirror-adjusting plate with mirror relative to the mirror housing in which the mirror housing frame with bowl are fixedly mounted.

During assembly, the bowl can already be fixedly secured on the mirror housing frame. The mirror actuator 35 with accessories can be assembled as a separate unit; this unit hence comprises the holder 1, the support 21 containing the motors and the transmission mechanism and the mirror-adjusting plate 33 with mirror 34. Subsequently, such unit can as a whole be snapped in the bowl in a simple manner, with the interposition of the dish.

The movement mechanism according to the invention enables a mirror actuator housing construction wherein the mirror rotation point S (see FIG. 39) is a virtual rotation point, formed by the intersection of the X-axis and the Y-axis, relative to which the actuator housing, i.e. the holder 1 with the support 21 and accessories, is movably connected to the mirror housing frame, including bowl 2, while the mirror-adjusting plate 33 with mirror 34 is fixedly mounted on the actuator housing. Further, in accordance with the invention, a mirror actuator housing construction is enabled wherein the drive means, i.e. the actuator 35, in the actuator housing on the one hand and the mirror-adjusting plate 33 with mirror 34 on the other, are located on either side of the mirror rotation point S of the mirror-adjusting plate 33.

The electrically adjustable mirror construction hitherto described is further particularly suitable for fitting an electric wiring for realizing, apart from the electric mirror adjustment, other functions for the use of the mirror in the mirror housing. Such functions may for instance relate to a mirror heating, electrically dimming of incident light, keeping the mirror water-free through vibrations, and the like. To that end, the edge 18 of the holder 1 (FIG. 39) comprises an electric plug terminal 36 for a cable 37 realizing the connection to the electric board network of the vehicle. Further, on the mirror-adjusting plate 33, a separate electric terminal 38 is present for an electric connection 39 to the plug terminal 36. Likewise, a separate electric terminal 40 is present on the housing of the actuator 35 for an electric connection 41 to the plug terminal 36, the lines 39 and 41 each forming a fixed looped through-connection of a number of cores of the line 37. Since the actuator housing 35 moves along with the mirror-adjusting plate 33, a vulnerable, flexible construction of the lines 39 and 41 is no longer necessary.

The invention is not limited to the embodiments described hereinabove with reference to the Figures, but comprises all kinds of modifications hereof, of course in so far as these fall within the protective scope of the following claims. In particular, reference be made to a construction as shown in FIGS. 34–37, where the dish 3 is on either side provided with outwardly bent lips or resilient elements 40, i.e. lips or resilient elements directed both to the bowl 2 and to the holder 1. In this manner, a defined friction between the bowl and the dish and between the dish and the holder can be realized.

The invention claimed is:

1. A movement mechanism comprising a substantially spherical holder and a substantially spherical bowl which, one inserted into the other, are rotatable relative to each other about a first axis, the X-axis, and a second axis, the Y-axis, said axes lying in a plane substantially coinciding with the plane of the outer edge of the holder or extending parallel thereto, characterized in that a dish located between the holder and the bowl is present, said dish being connected to the bowl for rotation about the X-axis only and connected to the holder for rotation about the Y-axis only.

2. A movement mechanism according to claim 1, characterized in that the holder or the dish is provided with diametrically opposite thickenings which, upon rotation of the dish relative to the holder about the X-axis, cooperate with relevant slots in the dish or holder respectively that extend in the direction of rotation.

3. A movement mechanism according to claim 1, characterized in that the dish is provided with a thickening and a diametrically opposite slot that extends in the direction of rotation, said thickening and said slot, upon rotation of the dish relative to the holder about the X-axis, cooperating with a slot in the holder extending in the direction of rotation and a diametrically opposite thickening on the holder respectively.

4. A movement mechanism according to claim 2 or 3, characterized in that the holder has its outer surface provided with circularly curved edges which, upon rotation of the dish relative to the holder about the X-axis, serve as guide edges for correspondingly shaped edges provided on the dish.

5. A movement mechanism according to claim 1, characterized in that the holder is provided with an outwardly directed, circular edge and the dish, viewed in a section perpendicular to the X-axis, is segment-shaped with an apex angle smaller than 180°, while in at least one extreme position of the dish relative to the holder, a relevant edge half of the dish abuts against the circular edge of the holder.

6. A movement mechanism according to claim 1, characterized in that holder has its outer surface provided with at least one edge against which, in an extreme position of the dish relative to the holder, a corresponding edge of the dish abuts.

7. A movement mechanism according to claim 1, characterized in that the bowl or the dish is provided with diametrically opposite thickenings which, upon rotation of the dish relative to the bowl about the Y-axis, cooperate with relevant slots in the dish or bowl respectively that extend in the direction of rotation.

8. A movement mechanism according to claim 1, characterized in that the bowl is provided with a thickening and a diametrically opposite slot extending in the direction of rotation, said thickening and said slot, upon rotation of the dish relative to the bowl about the Y-axis, cooperating with a slot in the dish, extending in the direction of rotation, and a diametrically opposite thickening on the dish respectively.

9. A movement mechanism according to claim 7 or 8, characterized in that the bowl is provided with circularly curved edges which, upon rotation of the dish relative to the bowl about the Y-axis, serve as guide edges for correspondingly shaped edges provided on the dish.

10. A movement mechanism according to claim 7, characterized in that in an extreme rotary position of the dish relative to the bowl, the thickenings for rotation and securement of the dish relative to the bowl are located against an end edge of the slots.

11. A movement mechanism according to claim 1, characterized in that the holder is provided with an outwardly directed, circular edge, while in at least one extreme position of the bowl relative to the dish, an edge of the bowl abuts against the circular edge of the holder.

12. A movement mechanism according to claim 1, characterized in that additional locking means are provided between the dish and the holder and between the dish and the bowl, for blocking a rotation of the bowl, dish and holder relative to each other about an axis, the Z-axis, perpendicular to the X-axis and the Y-axis.

13. A movement mechanism according to claim 1, characterized in that the dish is on both sides provided with outwardly set lips, to provide a defined friction between the bowl and the dish and between the dish and the holder.

14. A movement mechanism according to claim 1, characterized in that the holder, the bowl and the dish are manufactured from plastic.

15. A movement mechanism according to claim 1, characterized in that the holder and the bowl are manufactured from plastic and the dish is substantially manufactured from metal.

16. A movement mechanism according to claim 15, characterized in that the dish is punched from metal.

17. A movement mechanism according to claim 15, characterized in that the dish is provided with metal springs for realizing a defined friction between the bowl and the dish and between the dish and the holder.

18. A movement mechanism according to claim 1, characterized in that the holder, viewed in the X-Y plane, comprises two mutually perpendicular slots provided through the holder, each of said slots having an adjusting element provided therein for displacement by motor, said adjusting element being further freely movable in the bowl in a direction, viewed in the X-Y plane, perpendicular to the direction of the relevant slot in the holder, wherein, further, the adjusting element engages, through the relevant slot in the holder, a drive mechanism placed in the holder, said drive mechanism being connected to a motor that is likewise placed in the holder.

19. A movement mechanism according to claim 18, characterized in that on the holder, an adjusting plate for, for instance, a mirror is secured, and that the holder with the components fitted therein and secured thereon can be snapped into the bowl as a unit.

20. A movement mechanism according to claim 19, characterized in that the holder comprises an electric plug terminal, while on the adjusting plate, a separate electric terminal is present for an electric connection to the plug terminal on the holder.

21. A wing mirror for a vehicle, comprising:

a mirror; and a movement mechanism for the mirror, the movement mechanism having a substantially spherical holder supporting the mirror, and a substantially spherical bowl which, one inserted into the other, are rotatable relative to each other about a first axis, the X-axis, and a second axis, the Y-axis, said axes lying in a plane substantially coinciding with the plane of the outer edge of the holder or extending parallel thereto, characterized in that a dish located between the holder and the bowl is present, said dish being connected to the bowl for rotation about the X-axis only and connected to the holder for rotation about the Y-axis only.

* * * * *